United States Patent
Kauper

(10) Patent No.: US 8,672,332 B2
(45) Date of Patent: Mar. 18, 2014

(54) COMBINATION OF THE CHUCKING DEVICE AND A DRILL AND A CHUCKING DEVICE FOR A DRILL WITH CUTTING TIPS ON BOTH ENDS

(75) Inventor: Herbert Rudolf Kauper, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 1168 days.

(21) Appl. No.: 12/126,414

(22) Filed: May 23, 2008

(65) Prior Publication Data

US 2009/0020963 A1    Jan. 22, 2009

Related U.S. Application Data

(63) Continuation-in-part of application No. PCT/EP2006/011268, filed on Nov. 24, 2006.

(51) Int. Cl.
*B23B 31/103* (2006.01)
*B23B 51/06* (2006.01)

(52) U.S. Cl.
USPC .......... 279/20; 279/44; 279/45; 279/35; 408/59

(58) Field of Classification Search
USPC ............ 279/20, 44, 45, 35; 408/59, 56, 57
IPC ........................................ B23B 31/103,51/06
See application file for complete search history.

(56) References Cited

U.S. PATENT DOCUMENTS

| 206,591 | A | * | 7/1878 | Mabie | 81/112 |
| 359,798 | A | * | 3/1887 | Mann | 279/35 |
| 553,226 | A | * | 1/1896 | Brockett | 279/35 |
| 562,041 | A | * | 6/1896 | Seymour | 81/111 |
| 567,405 | A | * | 9/1896 | McDonald | 81/112 |
| 580,905 | A | * | 4/1897 | Shank | 81/115 |
| 637,025 | A | * | 11/1899 | Percival et al. | 279/35 |
| 837,225 | A | * | 11/1906 | Holman | 81/112 |

(Continued)

FOREIGN PATENT DOCUMENTS

| DE | 23 55 266 | | 5/1975 | |
| EP | 528101 A1 | * | 2/1993 | F16L 3/12 |

OTHER PUBLICATIONS http://www.merriam-webster.com/dictionary/about; Merriam-Webster online Dictionary; Sep. 9, 2013; p. 1.*

(Continued)

*Primary Examiner* — Eric A Gates
*Assistant Examiner* — Bayan Salone
(74) *Attorney, Agent, or Firm* — Larry R. Meenan, Esq.

(57) ABSTRACT

A combination of a chucking device and a drill and a chucking device for a drill with cutting tips on both ends. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

10 Claims, 14 Drawing Sheets

(56) References Cited

U.S. PATENT DOCUMENTS

| | | | | |
|---|---|---|---|---|
| 886,351 A * | 5/1908 | Crawford | | 269/57 |
| 960,074 A * | 5/1910 | Buser | | 279/35 |
| 1,411,292 A * | 4/1922 | Mueller | | 279/2.24 |
| 1,489,377 A * | 4/1924 | Wood et al. | | 30/245 |
| 1,527,991 A * | 3/1925 | Murphy | | 131/182 |
| 1,578,397 A * | 3/1926 | Cone | | 279/35 |
| 1,583,554 A * | 5/1926 | Hoover | | 81/53.2 |
| 1,657,615 A * | 1/1928 | Cone | | 279/35 |
| 1,964,030 A * | 6/1934 | Brush | | 175/383 |
| 2,101,140 A * | 12/1937 | Hege | | 604/143 |
| 2,325,394 A * | 7/1943 | Ismail | | 279/35 |
| 2,393,424 A * | 1/1946 | Selch | | 279/91 |
| 2,684,839 A * | 7/1954 | Rice | | 173/126 |
| 2,954,182 A * | 9/1960 | Bojanower | | 242/129.6 |
| 3,596,917 A * | 8/1971 | Meyer | | 279/89 |
| 3,703,916 A * | 11/1972 | Sundsten et al. | | 81/438 |
| 3,998,467 A * | 12/1976 | Petkovich | | 279/2.24 |
| 4,032,163 A * | 6/1977 | Holt | | 279/37 |
| 4,176,991 A * | 12/1979 | Egli | | 408/239 R |
| 4,325,661 A * | 4/1982 | Tickins | | 408/239 A |
| 4,491,443 A * | 1/1985 | DeCaro | | 408/239 A |
| 4,573,839 A * | 3/1986 | Finnegan | | 408/239 R |
| 4,583,892 A * | 4/1986 | Armbruckner | | 409/136 |
| 4,656,727 A * | 4/1987 | Itoh | | 483/55 |
| 4,869,399 A * | 9/1989 | Dubach | | 222/83 |
| 5,131,258 A * | 7/1992 | Kynl | | 72/466.8 |
| 5,494,185 A * | 2/1996 | Dubach | | 220/838 |
| 5,597,275 A * | 1/1997 | Hogan | | 408/239 R |
| 6,240,811 B1 * | 6/2001 | Oesterle et al. | | 81/90.2 |
| 6,241,434 B1 * | 6/2001 | Ajimi | | 408/238 |
| 6,247,217 B1 * | 6/2001 | Kilgore | | 29/255 |
| 6,302,408 B1 * | 10/2001 | Zierpka | | 279/75 |
| 6,443,462 B2 * | 9/2002 | Tempest | | 279/131 |
| 6,539,826 B2 * | 4/2003 | Oesterle et al. | | 81/90.2 |
| 6,616,445 B2 * | 9/2003 | Abels et al. | | 433/11 |
| 6,729,814 B2 * | 5/2004 | Dollar et al. | | 409/234 |
| 6,944,959 B2 * | 9/2005 | Bigden et al. | | 30/392 |
| 7,069,761 B2 * | 7/2006 | Taylor | | 72/302 |
| 7,097,398 B2 * | 8/2006 | Hernandez, Jr. | | 408/224 |
| 7,152,767 B2 * | 12/2006 | Seelhofer | | 222/536 |
| 7,290,425 B2 * | 11/2007 | Taylor | | 72/302 |
| 7,364,390 B2 * | 4/2008 | Krenzer et al. | | 408/230 |
| 7,594,784 B2 * | 9/2009 | Krenzer et al. | | 408/230 |
| 7,975,523 B2 * | 7/2011 | Schneider | | 72/481.1 |

OTHER PUBLICATIONS

International Search Report PCT/EP2006/0011268 and English translation thereof.

* cited by examiner

FIG. 8
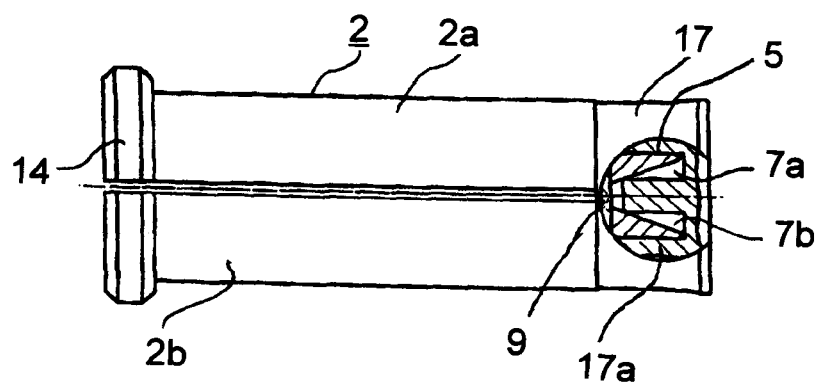
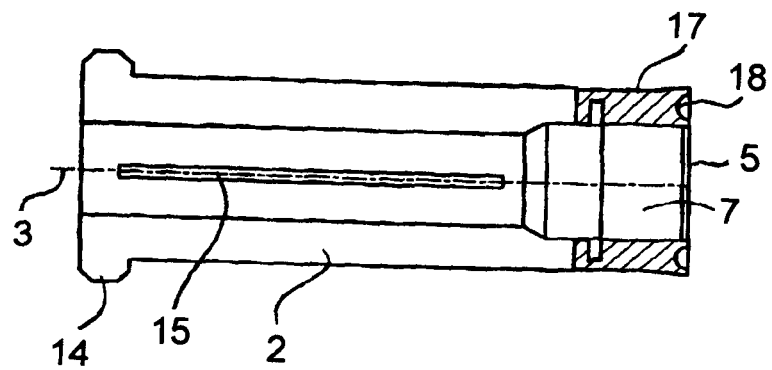
FIG. 9

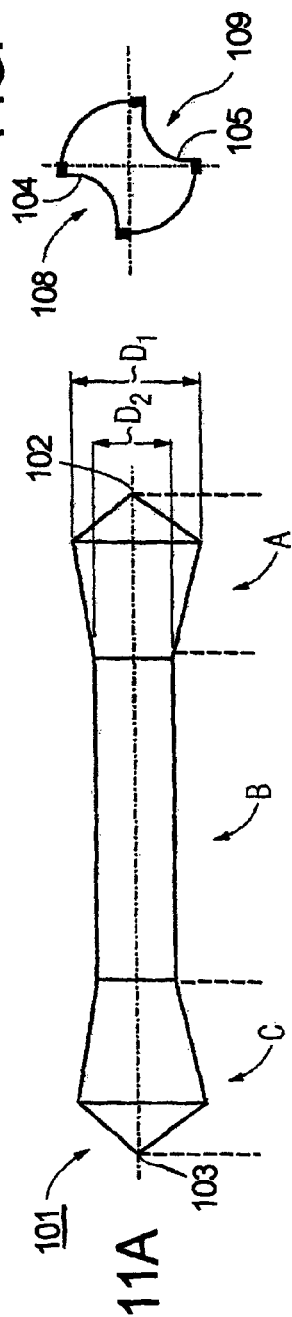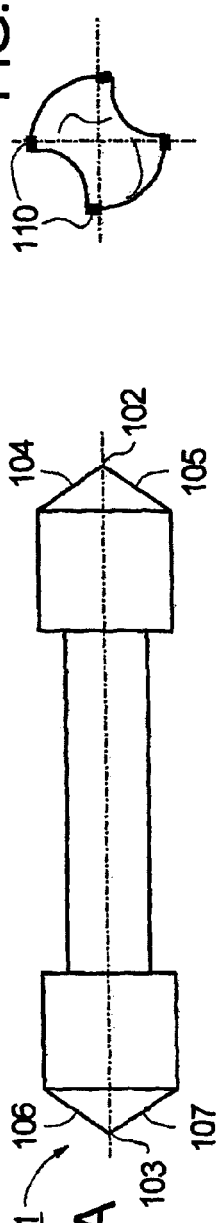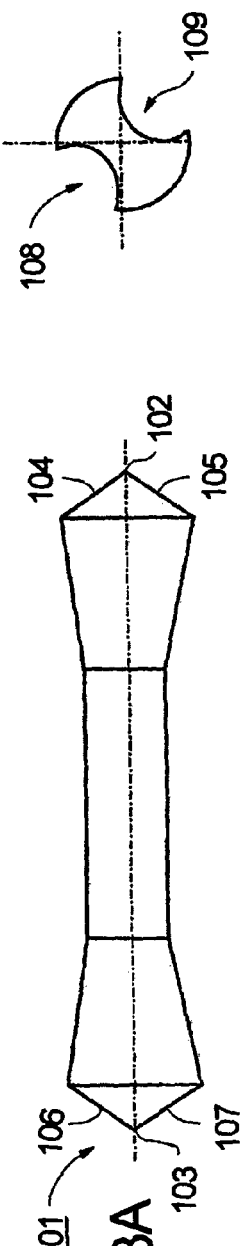

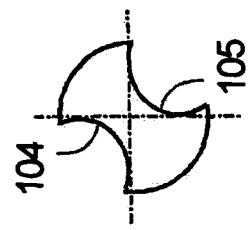
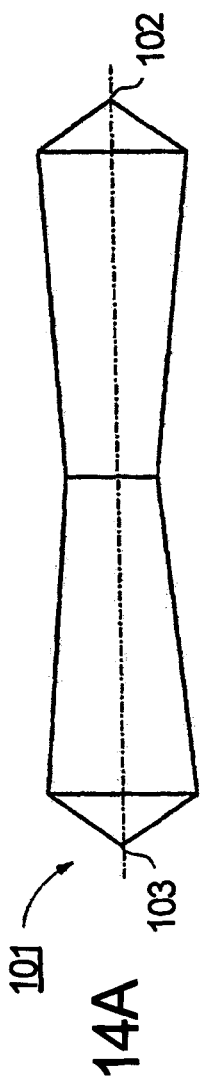
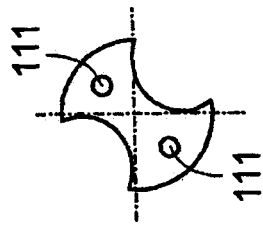
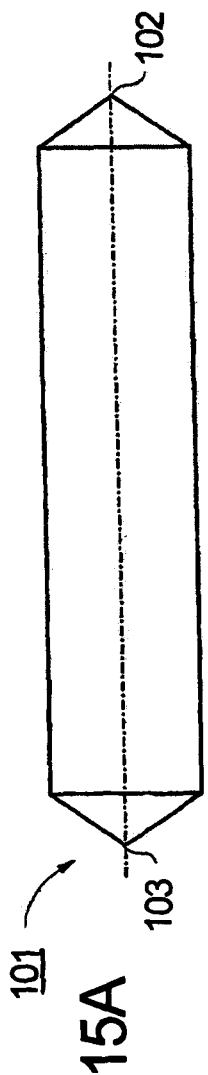

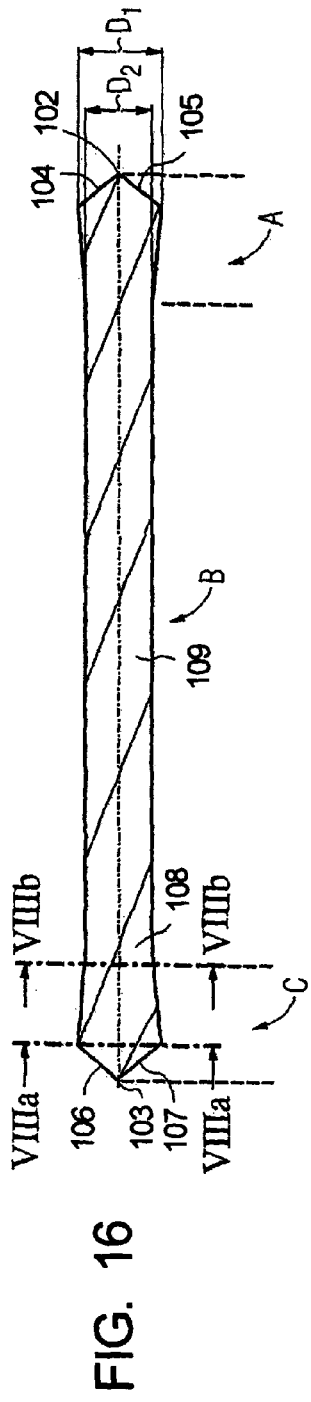
FIG. 16
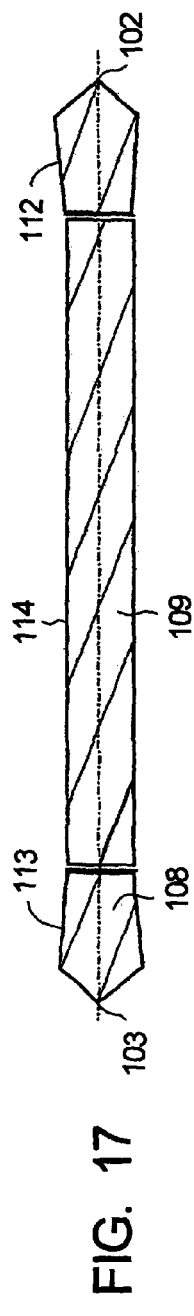
FIG. 17
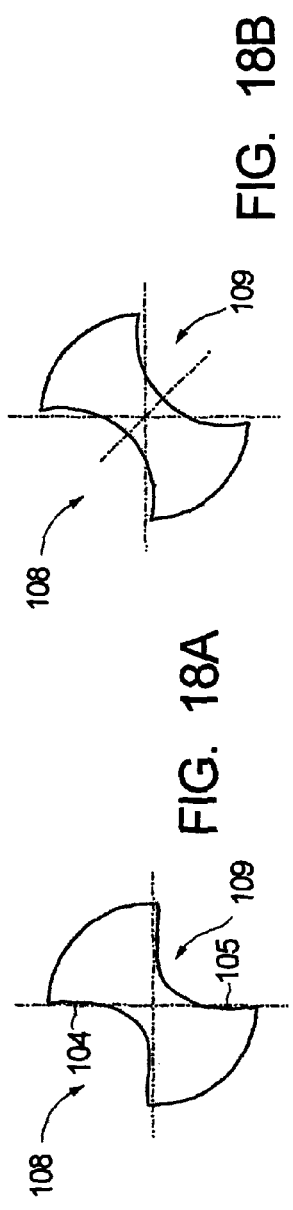
FIG. 18A
FIG. 18B

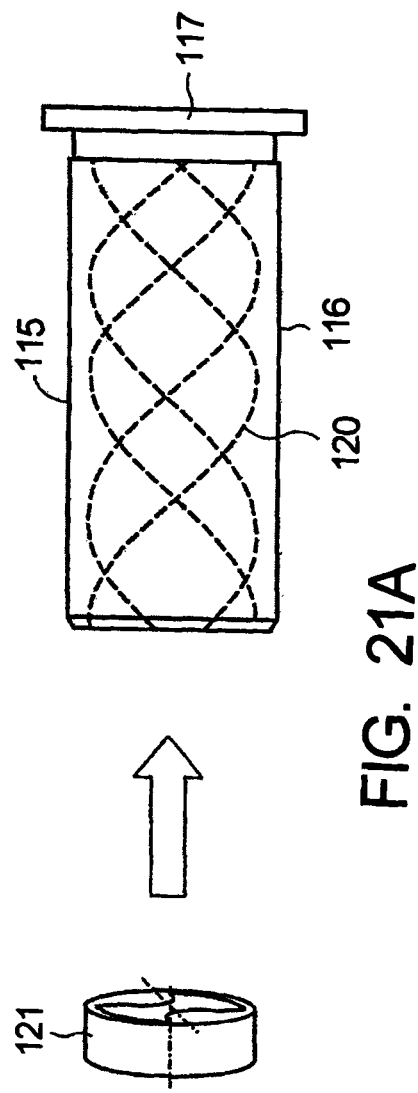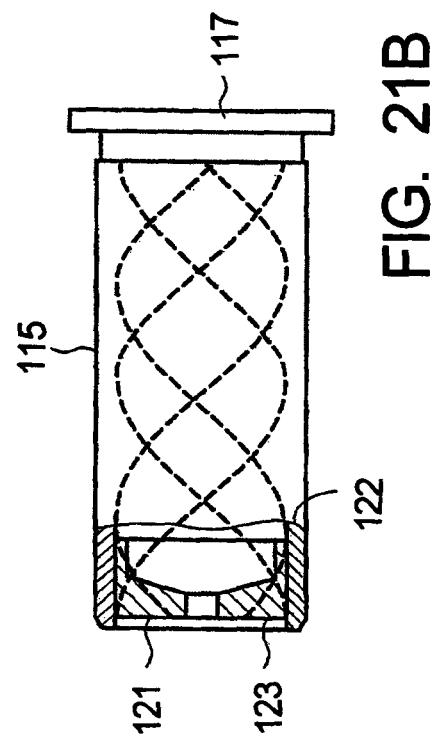
FIG. 21A
FIG. 21B

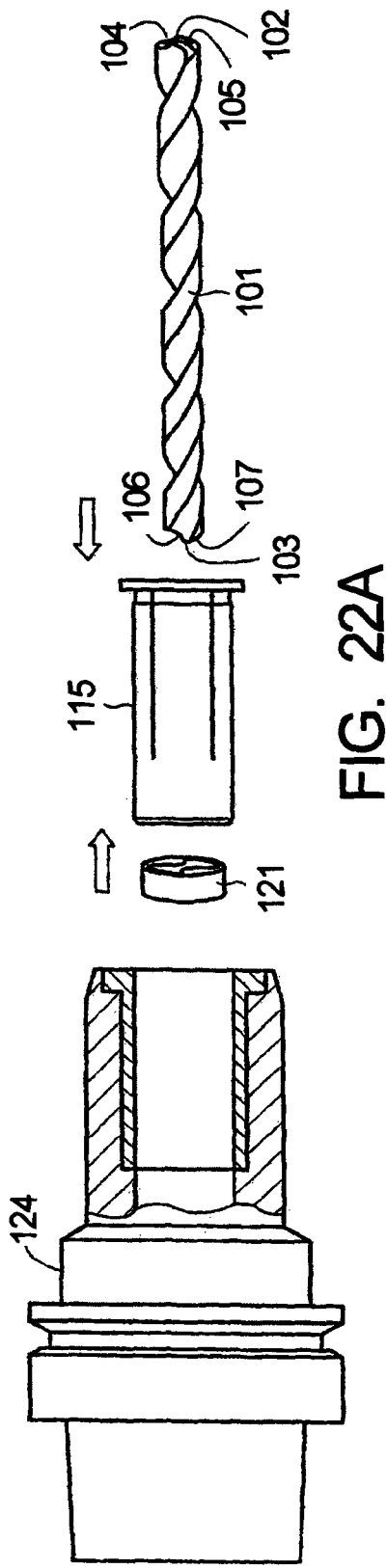
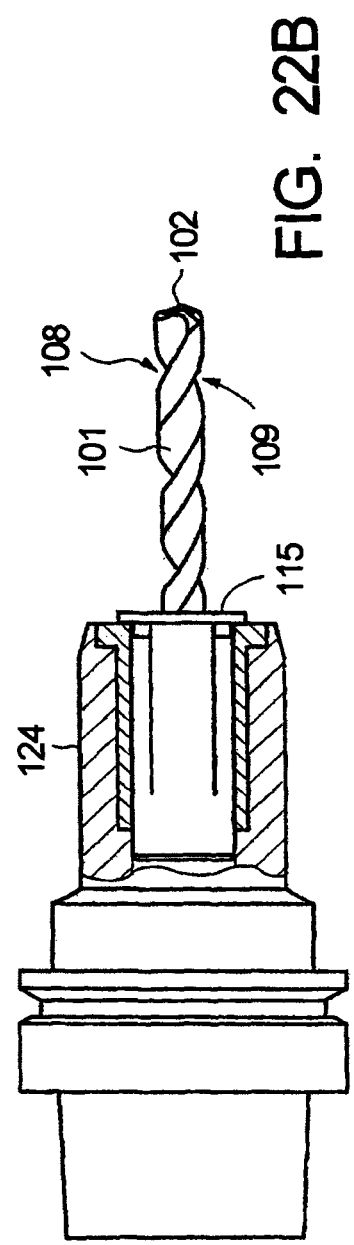

COMBINATION OF THE CHUCKING DEVICE AND A DRILL AND A CHUCKING DEVICE FOR A DRILL WITH CUTTING TIPS ON BOTH ENDS

CONTINUING APPLICATION DATA

This application is a Continuation-In-Part application of International Patent Application No. PCT/EP2006/011268, filed on Nov. 24, 2006, which claims priority from Federal Republic of Germany Patent Application No. 10 2005 056 440.2, filed on Nov. 26, 2005. International Patent Application No. PCT/EP2006/011268, was pending as of the filing date of this application. The United States was an elected state in International Patent Application No. PCT/EP2006/011268.

BACKGROUND

1. Technical Field

This application concerns a chucking device for a drill tool, such as with one drill tip each at every end of the tool. In this connection, a drill tool means a drill intended to generate a boring with a constant diameter just as well as, for example, a step drill or a countersinking tool.

2. Background Information

Such a chucking device with a cylindrical adapter sleeve is known, for instance, from DE 203 16 350, U1. The adapter sleeve described there also serves to house a drill tool having a constant drill or external diameter over its entire drill length, such drill tool featuring one drill tip at each end. However, said chucking device cannot be used for a drill tool, whose external diameter increases towards its drill ends or its drill tips.

For a drill tool of this embodiment a solution is described in accordance with DE 103 37 203, A, which requires the insertion of a twisted flute on the inside of the chucking device. This drill tool is conducted along said twisted flute when being inserted in the adapter sleeve. The unavoidable manufacturing tolerances and the high production expenditures to insert the twisted flutes into the inner surface of the chucking device represent a disadvantage of the described embodiment. Moreover, the percentage contact area for the drill tool is low, since said drill tool is held inside the adapter sleeve only between the two backs of the drill. Furthermore, inserting the twisted flute in the inner surface weakens the wall or the sleeve of the chucking device, thus either negatively influencing the stability, or requiring increased material and thus cost expenditures in thick-walled embodiments as compared to a design with smooth walls on the inside. An additional disadvantage is that only drill tools featuring an ascending slope compatible with the inserted twisted flute can be clamped.

Object or Objects

The task of this embodiment is to specify a chucking device suitable for also accepting a drill tool featuring one drill tip each at every end, with the drill diameter increasing towards the drill tips and with any ascending slope.

SUMMARY

The object may be achieved in at least one possible embodiment of a drill or cutting tool having a two-part adapter sleeve featuring shells that can be pivoted in relation to each other and that may be kept together captively in the process. The one chucking device featuring such a two-part adapter sleeve makes it possible to surround that part of the drill tool with the adapter sleeve, where the external diameter of the drill tool is constant. Its inner diameter can then also be kept constant over the sleeve length. This way, a positive—and in a clamped and braced state non-positive—connection over the length of the drill tool back enclosed by the adapter sleeve is achieved. This way, drill tools featuring drill diameters that increase towards the drill tips can be clamped easily and safely. For this purpose, the adapter sleeve housing the drill tool—in which the drill tool has then already been inserted—is centered in a chucking device, for instance a chuck, of a machine tool and non-positively secured.

The adapter sleeve comprises two shells that can be pivoted in relation to each other about a pivoting axis. Swinging open the shells allows the quick and simple assembly of the drill tool. In this connection, the pivoting axis may run parallel to the longitudinal axis of the sleeve. In this version featuring a pivoting axis that runs parallel to the longitudinal axis of the sleeve, the shells that can be pivoted in relation to each other are connected with one another with their facing longitudinal sides.

However, according to at least one possible embodiment, the pivoting axis runs crosswise to the longitudinal axis of the sleeve. In this version the two shells can be opened at one end of the sleeve, about wedge or V-shaped, about a pivoting axis there. This can for instance be achieved by transversely running recesses at a shell or by forming a dovetail-like folding wedge at both shells. This version promotes a simple and safe assembly of the drill tool.

The two shells are connected with each other in the area of the pivoting axis, such as by means of an elastic connection. This way, the two shells are captively held together. Moreover, the position of the shells to each other is predetermined further simplifying assembly.

This connection may be embodied in the form of a film hinge. For instance, polypropylene can be used as material, since an appropriate material displays the required softness and tensile strength for a durable function.

In the version, in which the pivoting axis runs crosswise to the longitudinal axis of the sleeve, the elastic, hinge-like connection may be accomplished by means of a connecting sleeve comprising of rubber. Said connecting sleeve is then non-positively and/or positively attached to the adapter sleeve in the area of the end of the sleeve assigned to the pivoting axis.

The elastic connecting sleeve may be embodied with two walls by forming a sealing lip on the inside and on the outside of the sleeve. Furthermore, the connecting sleeve features a ring-shaped sealing groove, which according to at least one possible embodiment runs at the perimeter of the front edge of the sleeve end. In the double-walled embodiment of the connecting sleeve this elastic circumferential groove forms the connecting post between the two sealing lips. By way of this embodiment the elastic connecting sleeve fulfills a dual function. On the one hand, the connecting sleeve forms the elastic pivoting connection provided for the ability of the connecting sleeve's two shells to pivot. On the other hand, the connecting sleeve can be deformed by means of a pressurized coolant or lubricant, such coolant or lubricant flowing against the sleeve end of the adapter sleeve—and there against the ring-shaped sealing groove—by producing an external seal effect against a chucking chamber wall, such as of an expansion chuck, and an inner seal effect against a sealing element, such sealing element being located in the adapter sleeve, or being attached to the drill end located in the adapter sleeve.

In one possible embodiment a recess is mounted in the area of one sleeve end of the adapter sleeve. When using a drill tool featuring one drill tip at each end, such a recess which may be realized in both shells then also accommodates the second drill tip not used for the chip removing process, if the inner diameter of the adapter sleeve is adapted to the drill diameter in the middle area of its drill body, and if, at the same time, the diameter increases towards the second drill tip of the drill tool.

The employed drill tools frequently feature at least one coolant and/or lubricant duct that provides for the supply of coolant and/or lubricant during the drilling, and with such duct extending over the entire length of the drill tool. Consequently, the second, unused drill tip may be sealed by the sealing element. This restricts the coolant and/or lubricant from reaching the internal space of the adapter sleeve. In one possible embodiment such sealing element shows the form of a cap with an opening aligned with the coolant and/or lubricant duct.

Cooling of the drill tip by means of the described coolant ducts is not possible in the case of small drill tool diameters. On the one hand the reason for this is that inserting very thin coolant ducts is very complex in terms of production. On the other hand, the coolant flow deteriorates as a result of the adhesive powers between fluid and wall, with such adhesive powers gaining more importance with smaller coolant duct diameters. Thus, in the case of small drill tool diameters, one possible embodiment is to insert at least one coolant duct in at least one of the two shells in such a way that a pressurized coolant can be sprayed through said duct onto the area of the drill tip.

In one possible embodiment the adapter sleeve features a sleeve collar at one end of the sleeve. Said sleeve collar serves as arrester of the adapter sleeve at the chucking device, at the chuck or a corresponding tool holding fixture. Moreover, according to at least one possible embodiment, at least one slot-shaped recess is inserted in at least one of the shells. The so-called expansion membrane of the chucking device then compresses the adapter sleeve coaxially, assuring a reliable non-positive connection between the drill tool and the adapter sleeve as a result of clamping the adapter sleeve in the tool holding fixture.

At least one embodiment provides that solid carbide drills, i.e. drill tools in the solid carbide group of practically all diameters between 2, mm and 25.4, mm, can be consistently clamped by means of the two-part adapter sleeve, in that a certain drill diameter range, e.g. 8.1, mm to 8.6, mm, is assigned to a clamping diameter—and thus to an internal diameter—by the corresponding adapter sleeve, in this example 8, mm. Thus, a significantly lower number of adapter sleeves is necessary as compared to the existing drill diameters. This way, for example, drills or drill tools with diameters between 3 mm and 8.5, mm can be clamped in a total of only twelve adapter sleeves. Thus, a total of only twelve adapter sleeves with different internal diameters need be provided for this drill diameter range.

In the aforementioned range twelve drill diameters in 0.5, mm increments between 3, mm and 8, mm are commonly provided. If special diameters of head or drill tip diameters, for instance a diameter of head of 8.27, mm, are desired, no further adapter sleeve needs to be provided. The reason is that even in the case of drill tools with two drill tips, whose outside diameter is greater than that of the middle area of the drill shaft, such middle area as well as the two-part adapter sleeve must always only be designed for the corresponding primary quantity of, for example, 8, mm.

Since, on the one hand, the two shells of the adapter sleeve can be pivoted in relation to each other and, on the other hand, are captively held together during such pivoting, especially by means of the elastic connection of the two shells, easy and reliable mounting as well as inserting in or joining of the drill tool with the adapter sleeve without error is promoted.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment is shown in the following figures:

FIGS. 8 and 9 show a lateral view or a longitudinal cut of the adapter sleeve in accordance with FIG. 7;

FIGS. 11A, 11B to FIGS. 15A, 15B each show, in schematic sections, an exemplary embodiment of a drilling tool with two drill bits;

FIGS. 16 and 17 each show a schematic side view of an additional exemplary embodiment of a drilling tool with two drill bits;

FIGS. 18A, 18B different cross sections of the drilling tool illustrated in FIG. 16;

FIGS. 21 A, 21 B, an arrangement with a chucking sleeve as illustrated in FIGS. 19A, 19B and a sealing washer as illustrated in FIGS. 20A to 20C;

FIGS. 22A, 22B an arrangement with an expansion chuck, a chucking sleeve as illustrated in FIGS. 19A, 19B, a sealing washer as illustrated in FIG. 20A to 20C and a drill with two drill bits;

Corresponding parts are provided in all figures with the same reference signs.

DESCRIPTION OF EMBODIMENT OR EMBODIMENTS

Figure 1:
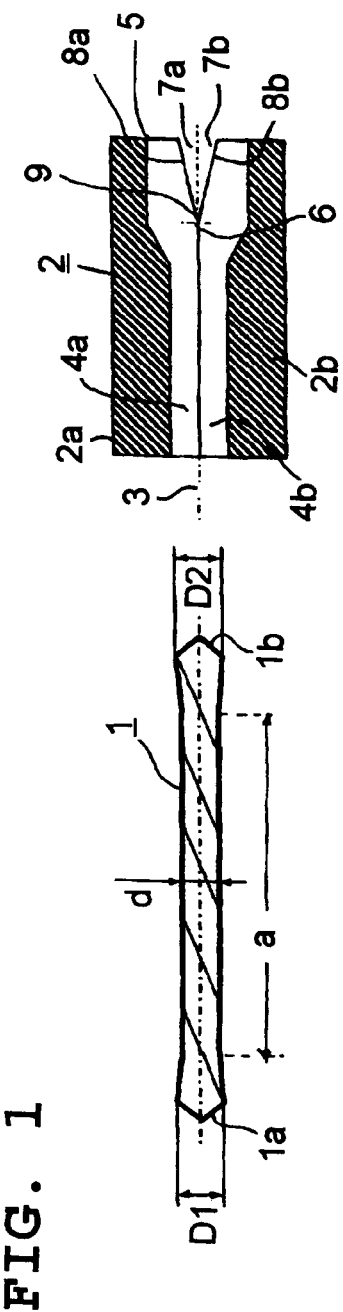
FIGS. 1 through 3 show a longitudinal cut of an adapter sleeve that can be pivoted transversely to the longitudinal axis of the sleeve before, during and after receiving a drill tool.

FIG. 1 shows a drill tool 1 comprising one drill tip 1a, 1b, each at every end, with a drill diameter D1 or D2 increasing towards the drill tips 1a, and 1b. Along a middle section of the drill a the diameter d of the drill tool 1 is constant. Diameter d may be <D1 or d<D2, with D1=D2 or D1≠D2. An adapter sleeve 2 that serves to house the drill tool 1 is embodied in two parts. For this, the adapter sleeve 2 comprises two shells 2a, and 2b, that can be pivoted crosswise to the longitudinal axis of the sleeve running in the x direction.

As is evident from FIG. 1, the two shells 2a, and 2b, of the adapter sleeve 2 form a hollow cylinder featuring a cylindrical outer circumference. To accommodate the drill tool 1 said hollow cylinder develops suitable cylinder paths 4a, and 4b, of the shells 2a, or 2b respectively. The two shells 2a, 2b, can be opened wedge or V-shaped in y direction at a sleeve end 5 around a pivoting axis 6 running in z direction and thus crosswise to the longitudinal axis of the sleeve 3. For this purpose, at the shells 2a, and 2b, recesses 7a, or 7b, respectively, in each case running transversely in x direction, are provided by forming an overall dovetail-like recess 7 (FIG. 3) in relation to the adapter sleeve 2. The cutting edges 8a and/or 8b, of the recesses 7a, or 7b, respectively, meet on the central longitudinal axis of the sleeve 3, and there, in the pivoting axis 6. By compressing the sleeve ends 5 of the two sleeve shells 2a, and 2b, in y direction opening of the adapter sleeve 2 around the pivoting axis 6, transversely to the longitudinal axis of the sleeve 3, is accomplished. Also, such a recess 7a, or 7b, may be provided at only one of the shells 2a, or 2b.

Figure 2:
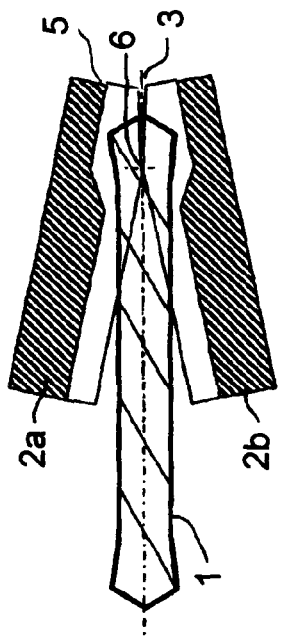

FIG. 2 shows the adapter sleeve 2 in opened condition, and with the drill tool 1 inserted between the two shells 2a, 2b. For this purpose, the drill tool 1 is inserted in the adapter sleeve 2, opened around the pivoting axis 6, in x direction along the longitudinal axis of the sleeve 3. For the pivotable connection of the two shells 2a and 2b, an effective elastic element 9 in the style of a film hinge may be provided in the area of the pivoting axis 6. Alternatively, or additionally, an elastic element 9 gripping the two shells 2a, and 2b at the outer circumference, such as in the area of the pivoting axis 6, may be provided in the form of a rubber ring or a spring.

Figure 3:
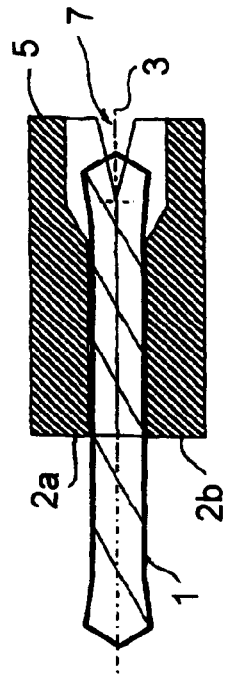

FIG. 3 shows the combination of adapter sleeve 2 and drill tool 1 in assembled condition as well as in a state capable of being mounted into a chucking device (FIG. 12). By swinging back the adapter sleeve 2 the drill tool 1 is positively enclosed by the two shells 2a, 2b. The recesses 7a, 7b, in the shells 2a, or 2b, respectively, of the adapter sleeve 2 are determined such that a sealing element, identified below as a sealing cap 10 (FIG. 5), can also be attached there on the drill tip 1b, enclosed in the adapter sleeve 2.

Figure 4:
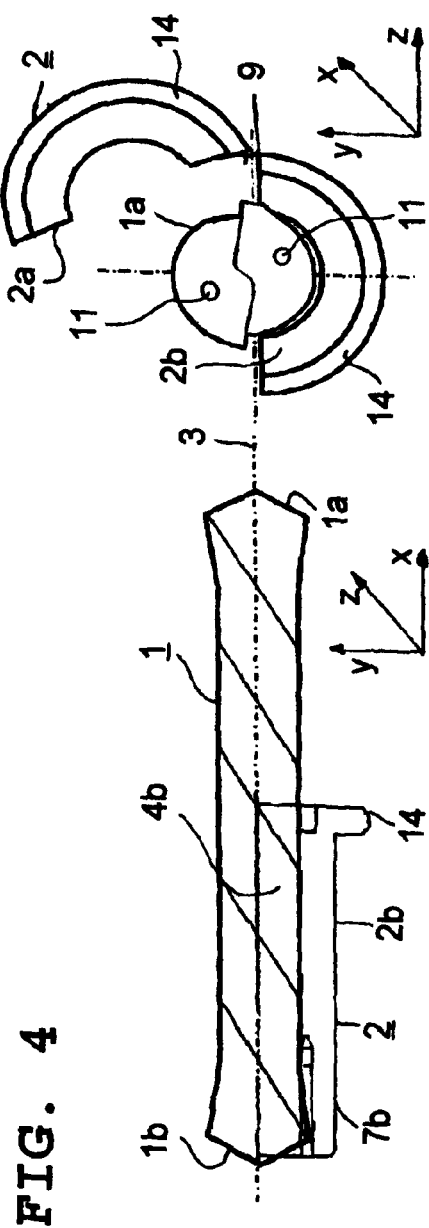
FIGS. 4 and 5 show in each case a longitudinal cut and a front view of the shells that can be pivoted in the direction of the longitudinal axis of the sleeve with enclosed drill tool, with open or closed adapter sleeve respectively.
Figure 5:
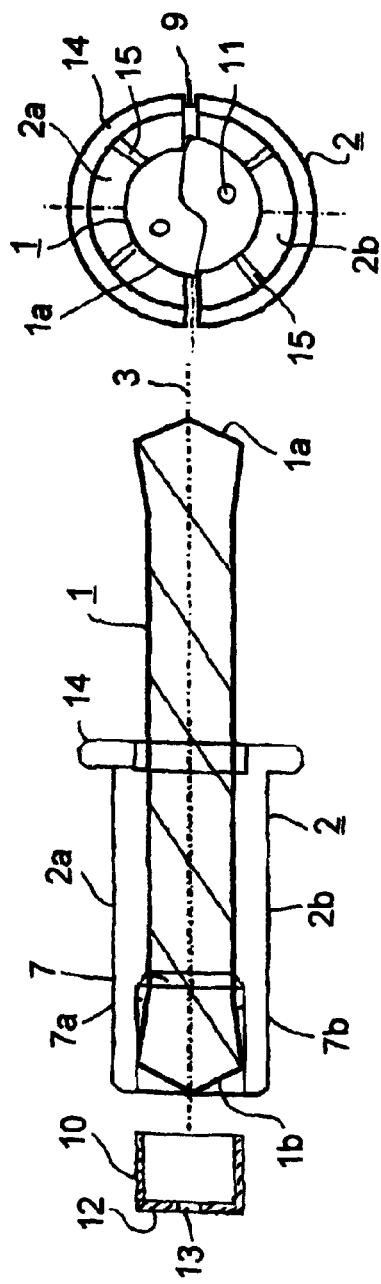
Figure 6:
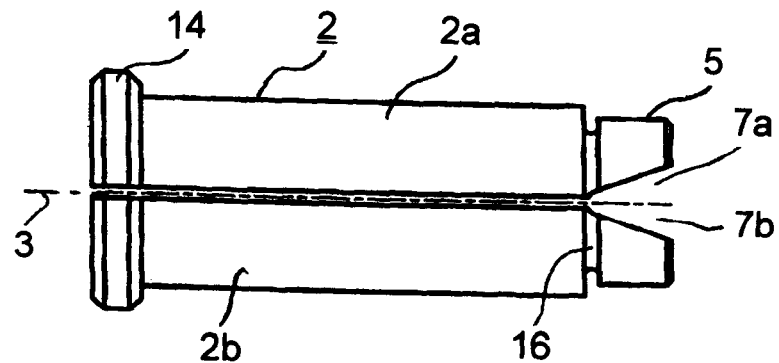
FIG. 6 shows a lateral view of the adapter sleeve in accordance with FIGS. 1 through 3 with an adapter end embodied in the form of a flange for mounting an elastic connecting sleeve.

FIGS. 4 and 5 show a two-part adapter sleeve 2 pivotable in the direction of the longitudinal axis of the sleeve 3, i.e. in x direction, in an opened or in a folded condition in y direction. The longitudinal cut of FIG. 4 depicts only one of the two shells 2a with the appropriate cylinder path. In turn, the two shells 2a, and 2b may be held together captively by means of an effective elastic element 9 in the style of a film hinge.

As can be seen from the respective front views of FIGS. 4 and 5 in the right figure halves, two coolant ducts 11 for conducting coolant and/or lubricant were inserted in the depicted drill tool 1. Thus, in turn a sealing cap 10 may be attached to the drill tip 1b, of the drill tool 1 that is not intended to be employed and enclosed in adapter sleeve 2. Said drill tool 1 encloses the drill tip 2b, and seals—in mounted condition—the sleeve interior against the coolant and/or lubricant reservoir. An opening 13 aligned with the coolant ducts 11 is inserted in the sealing cap 10—and there in its cap floor 12—, through which the coolant or lubricant, respectively, can flow into the coolant ducts 11 of the drill tool 1.

The drill tool 1 is inserted in the cylinder path 4a, or 4b, of the shell 2a, and/or 2b, along the drill area a, where the drill tool diameter d is constant, in such a way that the second drill tip 1b—if need be with the attached sealing cap 10—comes to rest in the recess 7a, 7b. The second shell 2b, is then folded over the hinge-like elastic element 9 in y direction onto the first shell 2a, such that both shells 2a, 2b, positively surround the drill tool 1 enclosed in their cylinder paths 4a, 4b.

FIG. 5 shows the adapter sleeve 2 with the inserted drill tool 1. In this assembly state it can be inserted into the appropriate chucking device. For an exact positioning inside the chucking device a sleeve collar 14 at the sleeve end of the adapter sleeve 2 opposite the opening or the recess 7a, 7b, serves for the enclosed drill tip 1b.

Slots 15 running in longitudinal or x direction are especially inserted in both shells 2a, 2b, in the embodiment of the two-part adapter sleeve 2 according to FIGS. 1 through 3 as well as in the embodiment according to FIGS. 4 and 5. Said slots 15 extend over, for instance, more than half the sleeve length. The so-called expansion membrane (FIG. 12) of the chucking device can thus compress the adapter sleeve 2 coaxially. Clamping the adapter sleeve 2 in the clamping tool holding fixture in turn promotes a reliable non-positive connection between the drill tool 1 and the adapter sleeve 2. The slots or clamping slots 15 serve to produce and improve the positive and non-positive connection between the drill tool 1 and the adapter sleeve 2 when clamping the adapter sleeve 2.

Figure 7:
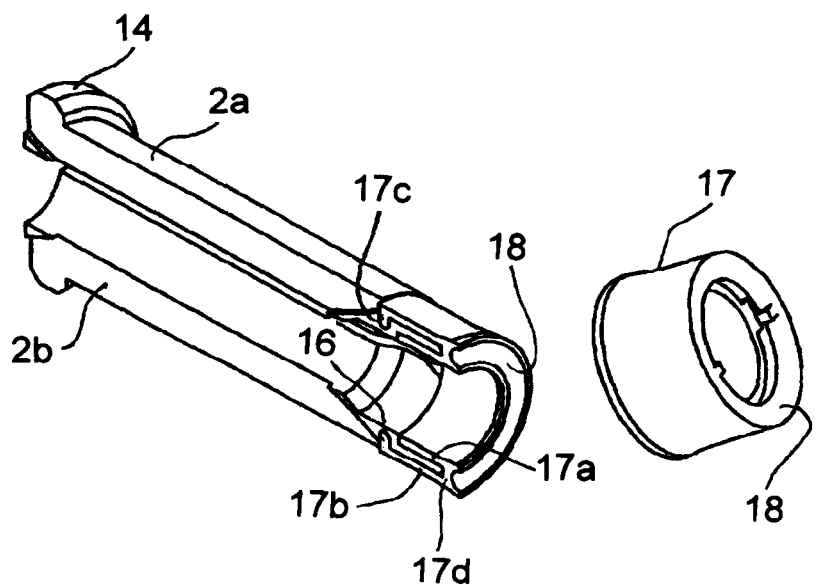
FIG. 7 shows a perspective cross-sectional view of the adapter sleeve in accordance with FIG. 6 with mounted connecting sleeve of a second sleeve version.

FIGS. 6 through 9 show the adapter sleeve 2 with a reduced sleeve end 5 offset in layers in terms of the external diameter in the area of the wedge or dovetail-like recess 7a, 7b. In the area of the pivotal axis 6 running transversely to the longitudinal axis of the sleeve 3 a circumferential groove 16 is provided. An elastic connecting sleeve 17, also separately depicted in FIG. 7, is slid on said offset sleeve end 5 of the adapter sleeve 2, and kept there non-positively or friction-locked, as well as additionally positively, due to the intervention in the circumferential groove 16.

As can be clearly seen from FIG. 7 by way of comparison, the elastic connecting sleeve 17 is configured as a double wall or as a pocket by forming an inner sealing lip 17a, and an outer sealing lip 17b, so that the two shells 2a, 2b, of the adapter sleeve 2 are enclosed by the elastic connecting sleeve 17 in the area of said sleeve end 5 on the inner as well as on the outer wall. An embossing collar 17c, of the outer wall sealing lip 17b, positively engages with the revolving circumferential groove 16 of the two-part adapter sleeve 2.

A sleeve web 17d, connecting the sealing lips 17a, and 17b, with each other shows a revolving circumferential groove 18, hereinafter also referred to as sealing groove. Said sealing groove 18 thus runs along the front edge of the sleeve end 5 of the adapter sleeve 2. The elastic connecting sleeve 17 may comprise rubber or a rubber-like material and forms the film or pivoting hinge-like elastic connecting element 9 in the area of the pivoting axis 6.

Figure 10:
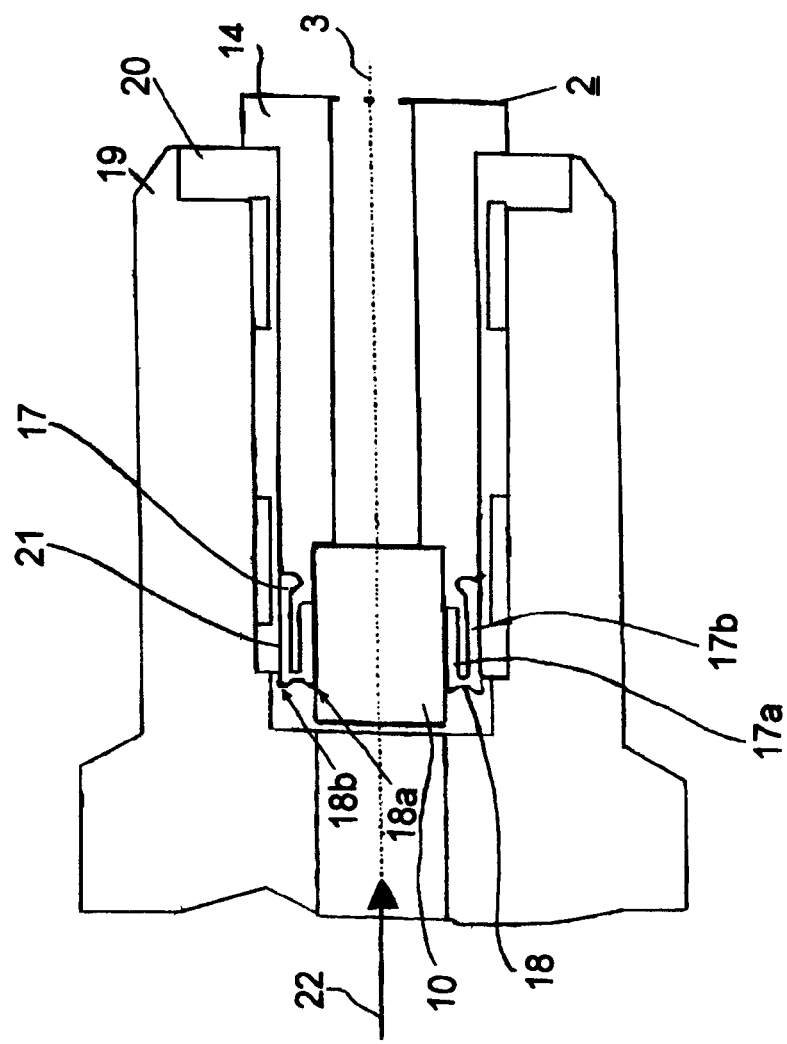
FIG. 10 cut-outs of a chucking device with clamped adapter sleeve.

FIG. 10 shows the two-part adapter sleeve 2 with the elastic connecting sleeve 17 clamped in an expansion chuck 19 with an expandable chamber or an expansion membrane 20. On the one hand, the arrangement of the connecting sleeve 17 with its inner sealing lip 17a, serving in its dual function as a pivoting hinge and as a connecting element, is recognizable at the sealing cap 10 enclosed in the recess or in the opening 7. On the other hand, the elastic connecting sleeve 17 with its external wall sealing lip 17b abuts the clamping chamber wall 21 of the expandable chamber 20 of the chuck or expansion chuck 19.

A coolant or lubricant flowing from the front against the connecting sleeve 17 in the direction of the depicted flow arrow 22 leads to the radial expansion of the sealing groove 18 as a result of a corresponding pressurization of the connecting sleeve 17 in the area of said sealing groove 18. Due to the pressurization caused by the coolant or the lubricant to the sealing groove 18, the operational result is that the internal circumferential groove edge 18a, of the sealing groove 18 creates an especially reliable inner seal between the adapter sleeve 2 and the sealing cap 10 serving as drill attachment. Analogously, the outer circumferential groove edge 18b of the sealing groove 18—as a result of its radial expansion— leads to an especially reliable outer seal between the adapter sleeve 2 and the expandable chamber 20 or the expansion chuck 20, respectively.

One feature or aspect of an embodiment is believed at the time of the filing of this patent application to possibly reside broadly in a chucking device for a drill tool, especially with one drill tip each at every end, characterized by a two-part adapter sleeve with shells that can be pivoted in relation to each other about a pivoting axis.

Another feature or aspect of an embodiment is believed at the time of the filing of this patent application to possibly reside broadly in a chucking device characterized in that the two shells are connected with each other by means of an elastic connection in the area of the pivoting axis.

Yet another feature or aspect of an embodiment is believed at the time of the filing of this patent application to possibly reside broadly in a chucking device characterized in that the pivoting axis runs crosswise to the longitudinal axis of the sleeve.

Still another feature or aspect of an embodiment is believed at the time of the filing of this patent application to possibly reside broadly in a chucking device characterized in that the two shells can be opened at one end of the sleeve, about V-shaped, about a pivoting axis.

A further feature or aspect of an embodiment is believed at the time of the filing of this patent application to possibly reside broadly in a chucking device characterized in that the two shells are connected with each other by means of a connection in the style of a film hinge.

Another feature or aspect of an embodiment is believed at the time of the filing of this patent application to possibly reside broadly in a chucking device characterized by an elastic connecting sleeve in the area of the end of the sleeve of the adapter sleeve assigned to the pivoting axis.

Yet another feature or aspect of an embodiment is believed at the time of the filing of this patent application to possibly reside broadly in a chucking device characterized in that the elastic connecting sleeve is configured double-walled by forming a sealing lip on the inside of the sleeve and a sealing lip on the outside of the sleeve.

Still another feature or aspect of an embodiment is believed at the time of the filing of this patent application to possibly reside broadly in a chucking device characterized in that the elastic connecting sleeve features a ring-shaped sealing groove running at the perimeter of the front edge of the end of the sleeve.

A further feature or aspect of an embodiment is believed at the time of the filing of this patent application to possibly reside broadly in a chucking device characterized in that the elastic connecting sleeve is deformable by means of a pressurized coolant or lubricant, such coolant or lubricant flowing against the sleeve end of the adapter sleeve, by producing an external seal effect against a chucking chamber wall, and an inner seal effect against a sealing element, such sealing element being located in the adapter sleeve.

Another feature or aspect of an embodiment is believed at the time of the filing of this patent application to possibly reside broadly in a chucking device characterized in that the pivoting axis runs parallel to the longitudinal axis of the sleeve, with the two shells being connected with each other at facing longitudinal sides so that they can pivot and move.

Yet another feature or aspect of an embodiment is believed at the time of the filing of this patent application to possibly reside broadly in a chucking device characterized in that the adapter sleeve features a recess in the area inside of one sleeve end to house a drill tip.

One feature or aspect of an embodiment is believed at the time of the filing of this patent application to possibly reside broadly in a chucking device characterized in that the inner diameter of the recess is adapted to the outer diameter of a sealing element that is attachable to the drill tip.

Another feature or aspect of an embodiment is believed at the time of the filing of this patent application to possibly reside broadly in a chucking device characterized in that at least one coolant duct is inserted in at least one of the shells in such a way that a pressurized coolant and/or lubricant can be sprayed through said coolant duct onto the area of the drill tip.

Yet another feature or aspect of an embodiment is believed at the time of the filing of this patent application to possibly reside broadly in a chucking device characterized in that the two shells feature sleeve collar at one end of the sleeve.

Still another feature or aspect of an embodiment is believed at the time of the filing of this patent application to possibly reside broadly in a chucking device characterized in that at least one slot-shaped recess is inserted in at least one of the two shells.

A further feature or aspect of an embodiment is believed at the time of the filing of this patent application to possibly reside broadly in a two-part adapter sleeve comprising shells that can be pivoted in relation to each other about a pivoting axis for a drill tool to be used in a chucking device, especially in a chuck of a machine tool.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that any or all the examples of patents, published patent applications, and other documents which are included in this application and including those which are referred to in paragraphs which state "Some examples of . . . which may possibly be used in at least one possible embodiment of the present application . . ." may possibly not be used or useable in any one or more or any embodiments of the application.

The sentence immediately above relates to patents, published patent applications and other documents either incorporated by reference or not incorporated by reference.

All of the patents, patent applications or patent publications, which were cited in the Search Report dated Apr. 2, 2007, and/or cited elsewhere are hereby incorporated by reference as if set forth in their entirety herein as follows: U.S. Pat. No. 4,325,661, and DE 23 55 266.

The following U.S. reference is hereby incorporated by reference as if set forth in its entirety herein as follows: U.S. application Ser. No.: 11/351,869, having publication number US-2006-0198708-A1, and having docket number KH-1948US(NHL-KEH-34US).

The corresponding foreign and international patent publication applications, namely, Federal Republic of Germany Patent Application No. 10 2005 056 440.2, filed on Nov. 26, 2005, having inventor Herbert KAUPER, and DE-OS 10 2005 056 440.2, and DE-PS 10 2005 056 440.2, and International Application No. PCT/EP2006/011268, filed on Nov. 24, 2006, having WIPO Publication No. WO2007/059980 and inventor Herbert KAUPER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37, C.F.R. §1.72(b). As stated in 37, C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

This application is a continuing application of International Patent Application No. PCT/EP2004/008987, filed on Aug. 11, 2004, which claims priority from Federal Republic of Germany Patent Application No. 103 37 203.2, filed on Aug. 13, 2003. International Patent Application No. PCT/EP2004/008987, was pending as of the filing date of this application. The United States was an elected state in International Patent Application No. PCT/EP2004/008987.

This application further relates to a drilling tool with two drill bits located on its opposite ends, wherein the drilling tool has a first drill bit and at least two forward cutting edges, a second drill bit and at least two rear cutting edges, and chip flutes (108, 109) that run from each of the forward cutting edges to a rear cutting edge. The term "drilling tool" as used here means a drill that is designed for the creation of a boring with a constant diameter, as well as, for example, a stepped drill or a combination drill and countersink tool.

A drilling tool of the type described above is known, for example, from DE 1 752 616, A1. This double-tipped drilling tool is manufactured from an extruded profile, which is divided into individual small rods. As a result of the extrusion process, the chip flutes of the drilling tool have an unvarying profile over its length.

A drilling tool, such as one that is used for machining metal workpieces, frequently has at least one replaceable cutting insert. The base body, to which the cutting insert can be fastened, can therefore be used beyond the useful life of the cutting insert. Drilling tools with replaceable cutting inserts, however, are typically limited to larger diameters. As a rule, one-piece drills are used for drilling smaller-diameter borings, for example up to 10, mm. In spite of the fact that they can generally be re-ground and re-used, their useful life is significantly shorter than that of a drill with a replaceable cutting insert or a plurality of replaceable cutting inserts.

In at least one possible embodiment, the drilling tool has a drill bit on each end, whereby each drill bit has at least two cutting edges. Spiral chip flutes extend continuously from the cutting edges on the one drill bit to the cutting edges on the other drill bit. In the vicinity of the drill bits, each of the at least two chip flutes corresponding to the number of cutting edges per drill bit have in themselves an asymmetrical shape. As a result of the asymmetrical configuration of each chip flute, these tools may be well suited for a cutting geometry with controlled chip formation that may be used for metal-removing operations. The asymmetrical profile of the chip flutes makes a transition, not later than toward the middle of the drilling tool, into a symmetrical profile, so that as the chip flutes proceed further toward the second drill bit, they once again assume a non-symmetrical shape, which may be the same as the shape at the first drill bit. As a variant from this configuration, the geometry of the second drill bit can also differ from the geometry of the first drill bit, and/or can also have an at least slightly different diameter, whereby in each case an asymmetrical profile of each chip flute is present in the areas adjacent to the drill bits and a symmetrical chip flute profile is present in an area that lies in between. The useful life of the drilling tool, which is also called a drill below, is therefore extended to almost twice that of a conventional drill that has only one drill bit.

The drilling tool, regardless of whether it is made out of a single material or of a plurality of different materials, may be provided so that it cannot be disassembled, for example for the extraction of a cutting insert. Possible materials that can be used as materials for the drill are all the materials or material combinations, with or without coatings, that are used in the prior art for conventional borers that have a single drill bit. If the drill bits are formed by separate tool bits, the bits may be permanently connected with the base body of the drilling tool, for example by soldering, whereby the tool bits may be made from a material that is harder than the material of the base body. In this embodiment, too, the chip flutes extend over the entire drilling tool, including the base body.

In one possible configuration, the drilling tool has cooling channels which each extend from one drill bit to the opposite drill bit.

Each cooling channel is thereby associated with an individual cutting edge on each drill bit, whereby the function of the inlet and outlet openings of the cooling channels is interchangeable.

In the vicinity of the drill bits, the drilling tool has a shape, for example, that corresponds to one of the twist drills known from EP 0 249 104, A1, DE 100 275 544, A1, or DE 199 55 172, A1. Twist borers of this type are characterized by, among other things, good pipe tapping properties and possible high feeds while still achieving a long useful life.

The drilling tool, together with a chucking device, may form a drilling device having the following characteristics. One part of the chucking device is a chucking sleeve which has an internal profiling that matches at least in part the shape of the chip flutes of the drill and thus makes possible substantially precise chucking. In this case, at least one opening cross section of the chucking sleeve at least in part matches the shape of the chip flutes. As a result, a penetration of chips into the chucking sleeve is restricted. Furthermore, an inner profiling of the chucking sleeve, which extends over the overall length, i.e. at least the major portion of the length of the chucking sleeve and matches the geometry of the drilling tool, makes possible a reliable chucking of the drilling tool, which is comparable to the chucking of a conventional drilling tool on the shank of a part of the tool without flutes.

Alternatively to the configuration disclosed herein above, a conventional draw-in collet chuck without internal profiling is also suitable for chucking the drilling tool, provided that the expansion capability of the collet is large enough to bridge any potential jumps or transitions in the diameter of the borer.

In accordance with one possible development of the chucking device disclosed herein above, a sealing washer is provided that interacts with the chucking sleeve, and may be inserted in it or pushed over it, and by means of which an improved seal with respect to coolant-lubricant can be achieved. The sealing washer may be located on the side of the chucking sleeve facing the rear drill bit. As a result, no coolant lubricant or practically no coolant lubricant that is introduced into the drilling tool gets into the chucking sleeve or outward between the drill and the chucking sleeve. The term "rear drill bit" in this context means the drill bit that under current operating conditions is not being used for chip removal. The sealing washer located in this area also provides mechanical protection for the rear drill bit, which may be damaged, for example, by the vibrations that occur during chip removal operation.

To be able to insert the chucking sleeve easily into a conventional chuck, e.g. a hydraulic expansion chuck, the chucking sleeve may have a constant outside diameter. The material for the chucking sleeve, which in this case is also called a chucking shank, may be plastic or another flexible material such as rubber. The inside surface of the chucking sleeve may be configured so that the chucking sleeve simultaneously performs the function of a sealing washer. In this configuration, the drill is provided so that it can be screwed into the chucking shank. The chucking shank can either have a constant inner profiling over its entire length or can be provided with a blind hole to receive the drilling tool. When the chucking shank is realized with a blind hole, cooling lubricant can be fed to the drilling tool from outside. Likewise, however, it is also possible, instead of the blind hole, an area with a smaller inside diameter is provided through which coolant lubricant can also be fed in axially to the drill.

One possible benefit of at least one possible embodiment may be, among other things, that a drill with two bits and continuous chip flutes can be used by means of a chucking sleeve coordinated with it, can be used in the same manner as a conventional borer that has only one bit, whereby in comparison to a conventional drill, there are no restrictions on its use, e.g. with regard to the maximum drilling depth.

Parts in the different figures that are identical, analogous or perform the same function are identified using the same numbers in all the figures.

FIGS. 11A and 11B to 15A and 15B each show an exemplary embodiment of a drilling tool 101 that has two drill bits 102, 103. Each drilling tool 101 is realized in one piece and has a first area A adjacent to the first drill bit 102, a contiguous middle area B and a rear area C that is adjacent to the second drill bit 103. In the exemplary embodiments illustrated in FIGS. 11A and 11B to 14A and 14B, a reduced diameter D2 in the middle area B is smaller than the tool diameter D1. Consequently, in one embodiment illustrated in FIGS. 12A and 12B, a set of different tools can each have different tool diameters D1, which are dictated in each case by the outer areas A, C of the drilling tool 101, but identical reduced diameters D2. All the tools of the set are thus suitable for the same chucking device. The cutting edges of each drilling tool 101 are identified by the reference numbers 104, 105, 106, 107, and the corresponding chip flutes by the reference numbers 108, 109. In each of the exemplary embodiments illustrated in FIGS. 11A and 11B and 12A and 12B, there are also four guide faces 110. Two cooling channels 111 are shown simply by way of example in the exemplary embodiment illustrated in FIGS. 15A and 15B, which may also be present in all the other exemplary embodiments.

FIGS. 16 and 17 illustrate the shape of the chip flutes 108, 109 which extend over the entire length of each drilling tool 101. While in the exemplary embodiment illustrated in FIG. 16, the drilling tool 101 is realized in one piece, for example, and is made of carbide coated using the CVD (Chemical Vapor Deposition) method, in the exemplary embodiment illustrated in FIG. 17, two tool bits 112, 113, which can, for example, be coated or uncoated tungsten carbide, are permanently connected with a base body 114 which forms the middle area B of the drilling tool 101, such as by soldering to the base body 114.

FIGS. 18A and 18B show two different cross sections of the drilling tool 101 illustrated in FIG. 16. In the vicinity of the maximum tool diameter D1, the drilling tool 101 has the asymmetrical profile of the chip flutes 108, 109 illustrated in FIG. 18A, which is optimized for the cutting method and chip formation. In this case, each chip flute 108, 109 is asymmetrical in itself, whereby the shape of the first chip flute 108 is the same as the shape of the second chip flute 109. On the other hand, in the vicinity of the reduced diameter D2, as illustrated in FIG. 18B, the cross section of each chip flute 108, 109 is symmetrical overall in comparison to the outer areas A, C of the drill 101. The chip flutes 108, 109, which are thereby optimized in terms of chip transport, have a constant cross section in the entire middle area B. The transition between the area of each chip flute 108, 109 that faces the drill bits 102, 103 and is in itself asymmetrical, and the middle, symmetrical area of each chip flute 108, 109 is continuous, i.e. without edges or discontinuities.

Figure 19B:
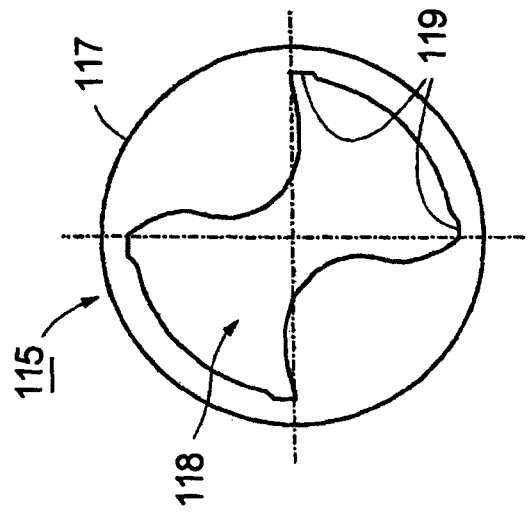
FIGS. 19A, 19B a chucking sleeve for a drilling tool with two drill bits and continuous chip flutes.
Figure 19A:
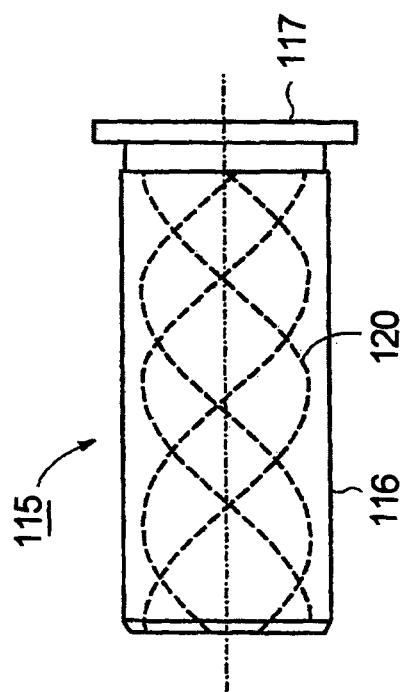

FIGS. 19A and 19B show a chucking sleeve 115 which is suitable for a drilling tool of the type illustrated in FIG. 16 or 17, for example. The chucking tool 115 is assembled from a cylinder body 116 and a cover 117, which has an opening cross section 118 that approximately matches the shape of the chip flutes 108, 109. The opening cross section 118, on the guide faces 110, has coordinated flutes 119, which are indicated as dotted lines in FIG. 19A as a portion of an inner profiling, and are continued into the cylinder body A16.

Figure 20C:
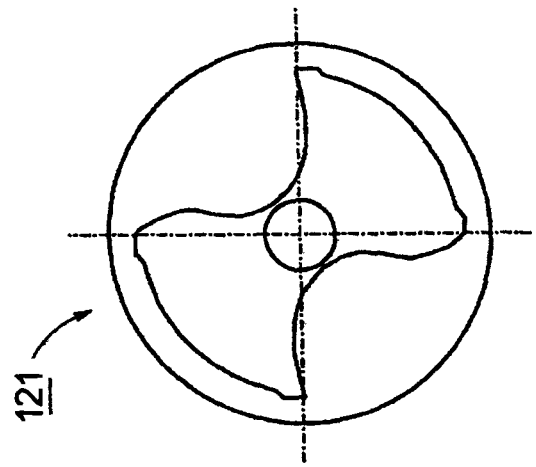
FIGS. 20A to 20C a sealing washer for a chucking sleeve as illustrated in FIGS. 19A, 19B.
Figure 20B:
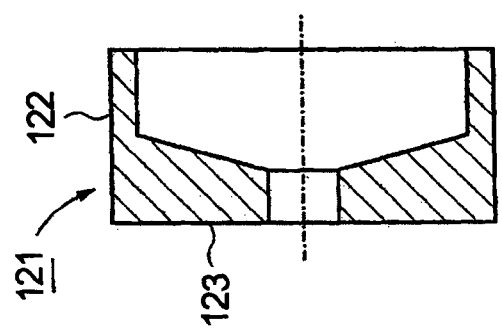
Figure 20A:
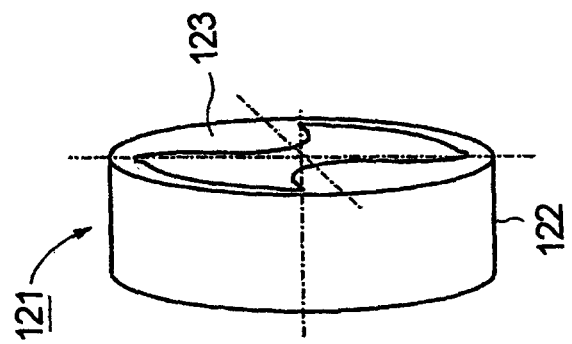

FIGS. 20A to 20C illustrate a sealing washer 121 which is made of an elastomer, which has an edge segment 122 in the shape of a cylinder jacket, and a sealing surface 123 bordered by said edge segment and matching the cross section of the chip flutes 108, 109.

The function of the clamping sleeve 115 and of the sealing washer 21 is illustrated in greater detail in FIGS. 21A, 21B, 22A and 22B. In the figures, the drilling tool 101 is chucked in an expansion chuck 124 by means of the chucking sleeve 115, in which the sealing washer 121 is inserted on the side facing away from the drill bit 102 used for the chip removal. The drilling tool 101 can be chucked in axially different positions in the expansion chuck 124, which can also theoretically be replaced by another type of chuck, such as a draw-in collet chuck. In general, the cutting edges 104, 105 which are used during the cutting operation are also called the forward cutting edges, and the cutting edges 106, 107 that are located on the inactive drill bit 103 that is kept in reserve are called the rear cutting edges. The cooling lubricant that is fed inside the expansion chuck 124 to the drilling tool 101 can flow at most only in a small proportion through the chip flutes 108, 109, and is thereby conducted through the cooling channels 111, which are not visible in this exemplary embodiment, to the drill bit 102.

Figure 23:
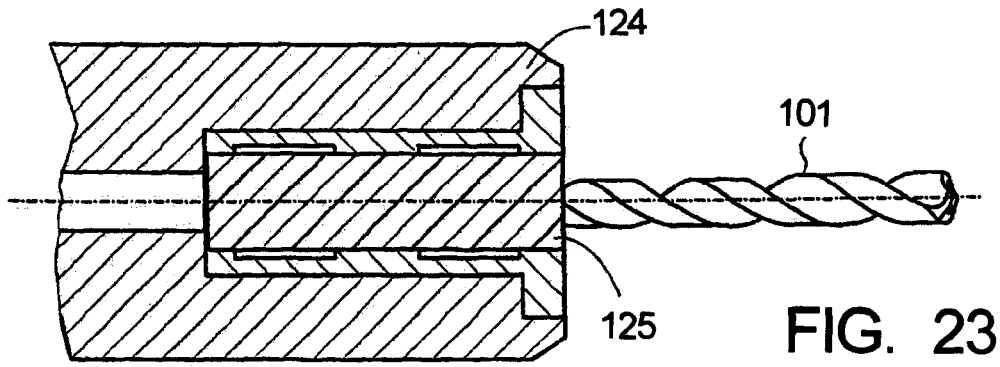
FIG. 23 an expansion chuck with a chucked borer.
Figure 24A:
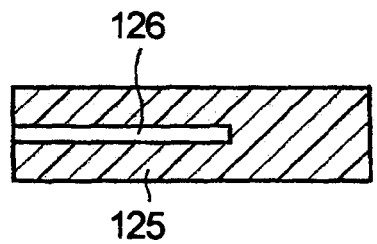
FIG. 24A, 24B a plastic shank that can be chucked in an expansion chuck as illustrated in FIG. 23.
Figure 24B:
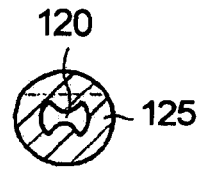

FIG. 23 shows, in an illustration that is analogous to FIG. 22B, a dual-bit drilling tool 101 chucked in an expansion chuck 124. Instead of the chucking sleeve 115 in FIG. 22B, however, a plastic shank 125 is used. The plastic shank 125 is shown in isolation in a schematic side and front view in FIGS. 24A and 24B. The front view (FIG. 24B) shows that the cross section of the plastic shank 125 is theoretically identical to the cross section of the sealing washer 121 (FIGS. 20A to 20C), i.e. it has an opening surfaces that matches the cross section of the drill 101. To make it easier to screw the drill 101 into the plastic shank 125 and to make the plastic shank 125 suitable for use with drills 101 of a different diameter, slots 126 in the axial direction are provided over slightly more than one-half of the length of the plastic shank 125. The plastic shank 125 illustrated in FIGS. 24A and 24B is realized for a drilling tool 101 with a twist angle of 30, degrees of the chip flutes. The slots 126 are unnecessary in some cases, such as if the plastic shank 125 is provided only for one specific drill diameter.

Figure 25A:
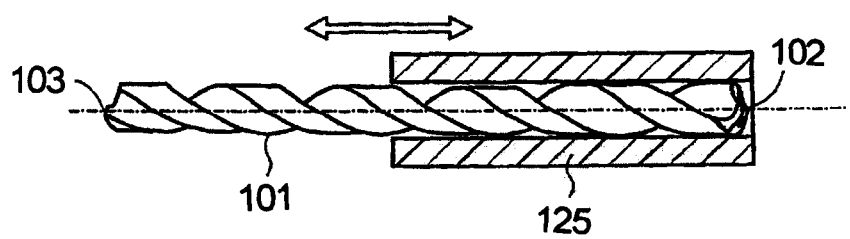
FIGS. 25A, 25B a drill in a plastic shank in different arrangements.
Figure 25B:
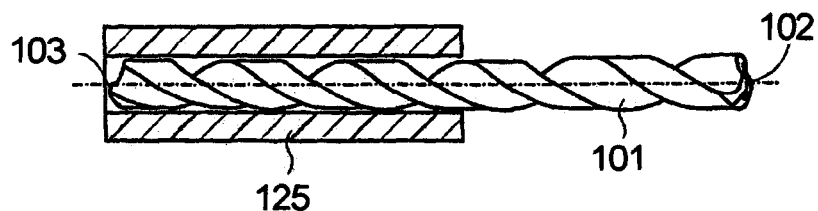

FIGS. 25A and 25B show the longitudinal section of the plastic shank 125. These figures, also show, as indicated by the double arrow, that the plastic shank 125 can be optionally located on each of the two sides of the drilling tool 101. In that case, one of the drill bits 102 is approximately flush with the end surface of the plastic shank 125. In a variant of the illustrated exemplary embodiment, the drill can also be axially shifted to any position inside the shank.

Figure 26A:
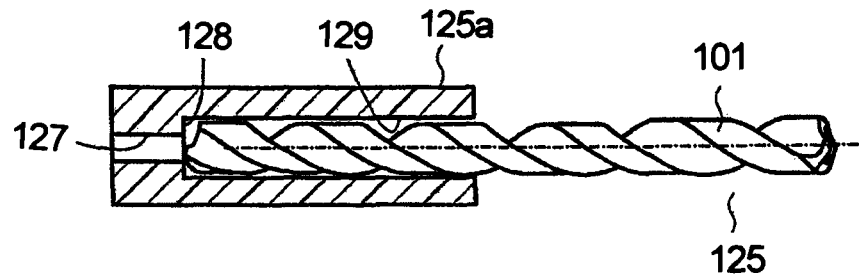
FIGS. 26A, 26B show a drill in a plastic shank in an alternative embodiment.
Figure 26B:
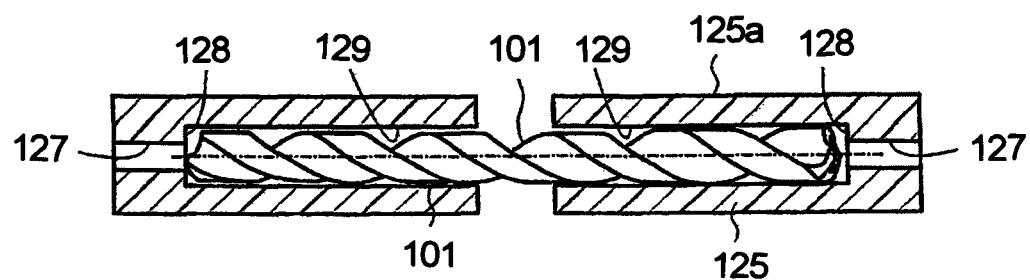

FIGS. 26A and 26B show, in views that are similar to FIGS. 25A and 25B, a drilling tool 101 held in a plastic shank. In contrast to the plastic shank 125 illustrated in FIGS. 23 to 25B, the plastic shank 125A shown in FIGS. 26A and 26B does not have a constant inside diameter, but a tapered diameter 127. When the drilling tool 101 is screwed all the way into the plastic shank 125*a*, its bit 102 is in contact against a peripheral step 128 which separates the tapered segment 127 from the remaining, untapered inner wall 129 of the plastic shank 125A. In contrast to the exemplary embodiments illustrated in FIGS. 23 to 25B, the drill bit is thereby at some distance from the end surface of the plastic shank 125. The tapered segment 127 can be used to feed coolant lubricant to the drilling tool 101, and therefore forms a coolant lubricant channel, if necessary. If there is no need to feed in a coolant lubricant, the plastic shank 125A can be completely closed at the point of the tapered segment 127.

One feature or aspect of an embodiment is believed at the time of the filing of this patent application to possibly reside broadly in a boring tool with first drill point and at least two front cutting edges, a second drill point and at least two rear cutting edges, and a running from a front cutting edge to a rear cutting edge characterized in that the flute is spiraled and formed asymmetrical into itself in the area bordering the front drill point, symmetrical into itself in a middle area, and asymmetrical into itself in an area bordering the rear drill point.

Another feature or aspect of an embodiment is believed at the time of the filing of this patent application to possibly reside broadly in a boring tool characterized in that the flutes are formed identically in the areas bordering the drill points.

Still another feature or aspect of an embodiment is believed at the time of the filing of this patent application to possibly reside broadly in a boring tool characterized in that the drill points are each formed by a tool tip connected to a body.

A further feature or aspect of an embodiment is believed at the time of the filing of this patent application to possibly reside broadly in a boring tool characterized by a coolant channel assigned to each cutting edge on both drill points.

Another feature or aspect of an embodiment is believed at the time of the filing of this patent application to possibly reside broadly in a boring tool characterized by a decreased diameter in the middle area in comparison to the tool diameter.

Yet another feature or aspect of an embodiment is believed at the time of the filing of this patent application to possibly reside broadly in a boring apparatus comprising a clamping device with a clamping sleeve with an interior profiling at least partially matching the shape of the flutes.

Still another feature or aspect of an embodiment is believed at the time of the filing of this patent application to possibly reside broadly in a boring apparatus, characterized in that an opening crosscut of the clamping sleeve is at least partially matched to the shape of the flutes.

A further feature or aspect of an embodiment is believed at the time of the filing of this patent application to possibly reside broadly in a boring apparatus characterized by a sealing disk acting jointly with the clamping sleeve.

Another feature or aspect of an embodiment is believed at the time of the filing of this patent application to possibly reside broadly in a twist drill for cutting metal, said twist drill comprising a maximum diameter of at most ten millimeters and an integral body, said twist drill comprising: a first drill bit portion comprising at least two cutting edges; a second drill bit portion comprising at least two cutting edges; a middle portion disposed between said first drill bit portion and said second drill bit portion; each of said first drill bit portion and said second drill bit portion and said middle portion together form said integral body; at least two helical chip flutes being disposed to run from said at least two cutting edges of said first drill bit portion to said at least two cutting edges of said second drill bit portion; said chip flutes each comprising a first portion disposed in said first drill bit portion, a second portion disposed in said second drill bit portion, and a third portion disposed in said middle portion; said first portion of each of said chip flutes comprising an asymmetrical cross-sectional profile about a radius of said twist drill intersecting at approximately the middle of a corresponding one of said chip flutes; said second portion of each of said chip flutes comprising an asymmetrical cross-sectional profile about a radius of said twist drill intersecting at approximately the middle of a corresponding one of said chip flutes; and said third portion of each of said chip flutes comprising a symmetrical cross-sectional profile about a radius of said twist drill intersecting at approximately the middle of a corresponding one of said chip flutes.

Yet another feature or aspect of an embodiment is believed at the time of the filing of this patent application to possibly reside broadly in a twist drill wherein: each of said first portion and said second portion of each of said chip flutes comprises a cutting edge and a non-cutting edge; said cross-sectional profile of each of said first portion and said second portion of each of said chip flutes comprises a first profile section adjacent said cutting edge and a second profile section adjacent said non-cutting edge; said first profile section comprises a portion comprising a substantially curvilinear, concave profile which defines a positive rake angle; and said second profile section comprises a portion comprising a substantially convex profile.

One feature or aspect of an embodiment is believed at the time of the filing of this patent application to possibly reside broadly in a twist drill in combination with a chucking device comprising a chucking sleeve, wherein at least one of (A), (B), (C), (D), (E), (F), (G), (H), (I), (J), and (K): (A) said cross-sectional profile of each of said chip flutes in said first portion is identical to said cross-sectional profile of each of said chip flutes in said second portion; (B) each of said first and second drill bit portions comprise originally individual tool bits which have been permanently connected to said middle portion; (C) said twist drill comprises cooling channels; and said cooling channels comprise openings disposed adjacent a corresponding one of each of said at least two cutting edges on each of said first and second drill bit portions; (D) said middle portion comprises a diameter less than the maximum diameter of said twist drill; (E) said chucking sleeve comprising an inner surface; and said inner surface comprises a profile that at least partly matches the profile of said at least two chip flutes; (F) said chucking sleeve comprises an opening configured to receive said twist drill; and said opening of said chucking sleeve comprises a cross-sectional profile that at least partly matches the cross-sectional profile of said at least two chip flutes; (G) said chucking device comprises a sealing washer configured and disposed to interact with said chucking sleeve; (H) said chucking sleeve is realized in the form of a chuck shank with a constant outside diameter; (I) said chucking sleeve comprises an axial slot; (J) said chucking sleeve comprises areas that have different inside diameters; and (K) said chucking sleeve comprises a blind hole to receive said twist drill.

Yet another feature or aspect of an embodiment is believed at the time of the filing of this patent application to possibly reside broadly in a twist drill comprising: a first drill bit portion comprising at least two cutting edges; a second drill bit portion comprising at least two cutting edges; a middle portion disposed between said first drill bit portion and said second drill bit portion; each of said first drill bit portion and said second drill bit portion and said middle portion together form an integral body; said first drill bit portion comprising chip flutes comprising an asymmetrical cross-sectional profile about a radius of said twist drill intersecting at approximately the middle of a corresponding one of said chip flutes; said second drill bit portion comprising chip flutes comprising an asymmetrical cross-sectional profile about a radius of said twist drill intersecting at approximately the middle of a corresponding one of said chip flutes; and said middle portion comprising chip flutes comprising a symmetrical cross-sectional profile about a radius of said twist drill intersecting at approximately the middle of a corresponding one of said chip flutes.

Still another feature or aspect of an embodiment is believed at the time of the filing of this patent application to possibly reside broadly in the combination wherein: said chip flutes in said first drill bit portion and said second drill bit portion each comprise a cutting edge and a non-cutting edge; said asymmetrical cross-sectional profile of said chip flutes in said first drill bit portion and said second drill bit portion comprises a first profile section adjacent said cutting edge and a second profile section adjacent said non-cutting edge; said first profile section comprises a portion comprising a substantially curvilinear, concave profile; and said second profile section comprises a portion comprising a substantially convex profile.

Yet another feature or aspect of an embodiment is believed at the time of the filing of this patent application to possibly reside broadly in a drilling tool with a first drill bit and at least two forward cutting edges, a second drill bit and at least two rear cutting edges, chip flutes that run from each of the forward cutting edges to a rear cutting edge, characterized in that the chip flute is a spiral and is realized so that it is in itself asymmetrical in an area adjacent to the forward drill bit, in itself symmetrical in a middle area, and in itself asymmetrical in an area adjacent to the rear drill bit.

Still another feature or aspect of an embodiment is believed at the time of the filing of this patent application to possibly reside broadly in a drilling tool characterized in that the chip flutes are realized so that they are identical in the areas adjacent to the drill bits.

A further feature or aspect of an embodiment is believed at the time of the filing of this patent application to possibly reside broadly in a drilling tool characterized in that the drill bits are each formed by a tool bit connected with a base body.

Another feature or aspect of an embodiment is believed at the time of the filing of this patent application to possibly reside broadly in a drilling tool characterized by a cooling channel on each cutting edge on both drill bits.

Yet another feature or aspect of an embodiment is believed at the time of the filing of this patent application to possibly reside broadly in a drilling tool characterized by a reduced diameter in the middle area compared to the tool diameter.

One feature or aspect of an embodiment is believed at the time of the filing of this patent application to possibly reside broadly in a drilling device, comprising: a chucking device with a chucking sleeve with an inner profiling that at least partly matches the shape of the chip flutes, a drilling tool.

Another feature or aspect of an embodiment is believed at the time of the filing of this patent application to possibly reside broadly in a drilling device characterized in that an opening cross section of the chucking sleeve at least partly matches the shape of the chip flutes.

Yet another feature or aspect of an embodiment is believed at the time of the filing of this patent application to possibly reside broadly in a drilling device characterized by a sealing washer hat interacts with the chucking sleeve.

Still another feature or aspect of an embodiment is believed at the time of the filing of this patent application to possibly reside broadly in a drilling device characterized in that the chucking sleeve is realized in the form of a chuck shank with a constant outside diameter.

A further feature or aspect of an embodiment is believed at the time of the filing of this patent application to possibly reside broadly in a drilling device characterized in that the chucking sleeve has an axial slot.

Another feature or aspect of an embodiment is believed at the time of the filing of this patent application to possibly reside broadly in a drilling device characterized in that the chucking sleeve has areas that have different inside diameters.

Yet another feature or aspect of an embodiment is believed at the time of the filing of this patent application to possibly reside broadly in a drilling device characterized in that the chucking sleeve has a blind hole to receive the drilling tool.

One feature or aspect of an embodiment is believed at the time of the filing of this patent application to possibly reside broadly in a cutting tool comprising: a first cutting bit portion comprising at least two cutting edges; a second cutting bit portion comprising at least two cutting edges; a middle portion disposed between said first cutting bit portion and said second cutting bit portion; each of said first cutting bit portion and said second cutting bit portion and said middle portion together form an integral body; said first cutting bit portion comprising chip flutes comprising an asymmetrical cross-sectional profile about a radius of said cutting tool intersecting at approximately the middle of a corresponding one of said chip flutes; said second cutting bit portion comprising chip flutes comprising an asymmetrical cross-sectional profile about a radius of said cutting tool intersecting at approximately the middle of a corresponding one of said chip flutes; and said middle portion comprising chip flutes comprising a symmetrical cross-sectional profile about a radius of said cutting tool intersecting at approximately the middle of a corresponding one of said chip flutes.

Another feature or aspect of an embodiment is believed at the time of the filing of this patent application to possibly reside broadly in the cutting tool, wherein: said chip flutes in said first cutting bit portion and said second cutting bit portion each comprise a cutting edge and a non-cutting edge; said asymmetrical cross-sectional profile of said chip flutes in said first cutting bit portion and said second cutting bit portion comprises a first profile section adjacent said cutting edge and a second profile section adjacent said non-cutting edge; said first profile section comprises a portion comprising a substantially curvilinear, concave profile; and said second profile section comprises a portion comprising a substantially convex profile.

Yet another feature or aspect of an embodiment is believed at the time of the filing of this patent application to possibly reside broadly in the cutting tool in combination with a chucking device comprising a chucking sleeve, comprising at least one of (A), (B), (C), (D), (E), (F), (G), (H), (I), (J), (K), (L), and (M): (A) said cross-sectional profile of each of said chip flutes in said first cutting bit portion is identical to said cross-ssectional profile of each of said chip flutes in said second cutting bit portion; (B) each of said first and second cutting bit portions comprise originally individual tool bits which have been permanently connected to said middle portion; (C) said tool comprises cooling channels; and said cooling channels comprise openings disposed adjacent a corresponding one of each of said at least two cutting edges on each of said first and second cutting bit portions; (D) said middle portion comprises a diameter less than the maximum diameter of said cutting tool; (E) said chucking sleeve comprises an inner surface; and said inner surface comprises a profile that at least partly matches the profile of said at least two chip flutes; (F) said chucking sleeve comprises an opening configured to receive said cutting tool; and said opening of said chucking sleeve comprises a cross-sectional profile that at least partly matches the cross-sectional profile of said at least two chip flutes; (G) said chucking device comprises a sealing washer configured and disposed to interact with said chucking sleeve; (H) said chucking sleeve is realized in the form of a chuck shank with a constant outside diameter; (I) said chucking sleeve comprises an axial slot; (J) said chucking sleeve comprises areas that have different inside diameters; (K) said chucking sleeve comprises a blind hole to receive said cutting tool; (L) said chip flutes of said first cutting bit portion, said second cutting bit portion, and said middle portion together form chip flutes disposed to run from said at least two cutting edges of said first cutting bit portion to said at least two cutting edges of said second cutting bit portion; and (M) said cutting edge of each of said chip flutes in said first cutting bit portion and second cutting bit portion define a positive rake angle.

A further feature or aspect of an embodiment is believed at the time of the filing of this patent application to possibly reside broadly in a cutting tool comprising: a first cutting bit and at least two forward cutting edges; a second cutting bit and at least two rear cutting edges; chip flutes that run from each of the forward cutting edges to a corresponding one of the rear cutting edges; and each of the chip flutes is realized so that its cross-sectional profile is in itself asymmetrical about a radius of said cutting tool in an area adjacent to the forward cutting bit, in itself symmetrical about a radius of said cutting tool in a middle area that connects said cutting bits, and in itself asymmetrical about a radius of said cutting tool in an area adjacent to the rear cutting bit.

Another feature or aspect of an embodiment is believed at the time of the filing of this patent application to possibly reside broadly in the cutting tool wherein the chip flutes are configured to be identical in the areas adjacent to the cutting bits.

Yet another feature or aspect of an embodiment is believed at the time of the filing of this patent application to possibly reside broadly in the cutting tool wherein the cutting bits are each formed by a tool bit connected with a base body.

Still another feature or aspect of an embodiment is believed at the time of the filing of this patent application to possibly reside broadly in the cutting tool wherein the cutting tool comprises a cooling channel on each cutting edge on both cutting bits.

A further feature or aspect of an embodiment is believed at the time of the filing of this patent application to possibly reside broadly in the cutting tool wherein the cutting tool has a reduced diameter in the middle area compared to the tool diameter.

Another feature or aspect of an embodiment is believed at the time of the filing of this patent application to possibly reside broadly in the cutting tool in combination with a cutting device, wherein the cutting device comprises a chucking device with a chucking sleeve with an inner profiling that at least partly matches the shape of the chip flutes.

Yet another feature or aspect of an embodiment is believed at the time of the filing of this patent application to possibly reside broadly in the combination wherein an opening cross section of the chucking sleeve at least partly matches the shape of the chip flutes.

One feature or aspect of an embodiment is believed at the time of the filing of this patent application to possibly reside broadly in the combination comprising a sealing washer that interacts with the chucking sleeve.

Another feature or aspect of an embodiment is believed at the time of the filing of this patent application to possibly reside broadly in the combination wherein the chucking sleeve is realized in the form of a chuck shank with a constant outside diameter.

Yet another feature or aspect of an embodiment is believed at the time of the filing of this patent application to possibly reside broadly in the combination wherein the chucking sleeve has an axial slot.

Still another feature or aspect of an embodiment is believed at the time of the filing of this patent application to possibly reside broadly in the combination wherein the chucking sleeve has areas that have different inside diameters.

A further feature or aspect of an embodiment is believed at the time of the filing of this patent application to possibly reside broadly in the combination wherein the chucking sleeve has a blind hole to receive the cutting tool.

Another feature or aspect of an embodiment is believed at the time of the filing of this patent application to possibly reside broadly in a rotary cutting tool having an axis of rotation, said cutting tool comprising: a first cutting bit portion comprising at least two cutting edges; a second cutting bit portion comprising at least two cutting edges; a middle portion disposed between said first cutting bit portion and said second cutting bit portion; each of said first cutting bit portion and said second cutting bit portion and said middle portion together form an integral body; said first cutting bit portion comprising a chip flute; said chip flute of said first cutting bit portion comprising an asymmetrical cross-sectional profile; said asymmetrical cross-sectional profile of said chip flute of said first cutting bit portion being divided into a first profile section and a second profile section, which said sections have substantially similar length and each is of different curvature with respect to one another; said second cutting bit portion comprising a chip flute; said chip flute of said second cutting bit portion comprising an asymmetrical cross-sectional profile; said asymmetrical cross-sectional profile of said chip flute of said second cutting bit portion being divided into a first profile section and a second profile section, which said sections have substantially similar length and each is of different curvature with respect to one another; said middle portion comprising a chip flute; said chip flute of said middle portion comprising a symmetrical cross-sectional profile; said symmetrical cross-sectional profile of said chip flute of said middle portion being divided into a first profile section and a second profile section, which said sections have the same length and the same curvature.

Yet another feature or aspect of an embodiment is believed at the time of the filing of this patent application to possibly reside broadly in the cutting tool wherein: said first profile section of said asymmetrical cross-sectional profile of said chip flute of each of said first cutting bit portion and said second cutting bit portion comprises a portion comprising a substantially curvilinear, concave profile; and said second profile section of said asymmetrical cross-sectional profile of said chip flute of each of said first cutting bit portion and said second cutting bit portion comprises a portion comprising a substantially convex profile.

What is claimed is:

1. A chucking device for a drill tool comprising a two-part adapter sleeve with shells that can be pivoted in relation to each other about a pivoting axis,
where the shells are configured to receive a cylindrically shaped drill having one drill tip at each end,
wherein the two shells are connected with each other by an elastic connection in the area of the pivoting axis,
wherein the pivoting axis runs crosswise to the longitudinal axis of the sleeve,
wherein the two shells can be opened at one end of the sleeve, about V-shaped, about a pivoting axis,
wherein the two shells are connected with each other by means of a connection in the style of a film hinge,
wherein an elastic connecting sleeve in the area of the end of the sleeve of the adapter sleeve assigned to the pivoting axis,
wherein the elastic connecting sleeve is configured double-walled by forming a sealing lip on the inside of the sleeve and a sealing lip on the outside of the sleeve,
wherein the elastic connecting sleeve features a ring-shaped sealing groove running at the perimeter of the front edge of the end of the sleeve, and
wherein the elastic connecting sleeve is deformable by means of a pressurized coolant or lubricant, such coolant or lubricant flowing against the sleeve end of the adapter sleeve, by producing an external seal effect against a chucking chamber wall, and an inner seal effect against a sealing element, such sealing element being located in the adapter sleeve.

2. The chucking device in accordance with claim 1, wherein the pivoting axis runs parallel to the longitudinal axis of the sleeve, with the two shells being connected with each other at facing longitudinal sides so that they can pivot and move.

3. The chucking device in accordance with claim 2, wherein the adapter sleeve features a recess in the area inside of one sleeve end to house a drill tip.

4. The chucking device in accordance with claim 3, wherein the inner diameter of the recess is adapted to the outer diameter of a sealing element that is attachable to the drill tip.

5. The chucking device in accordance with claim 4, wherein at least one coolant duct is inserted in at least one of the shells in such a way that a pressurized coolant and/or lubricant can be sprayed through said coolant duct onto the area of the drill tip.

6. The chucking device in accordance with claim 5, wherein the two shells feature sleeve collar at one end of the sleeve.

7. The chucking device in accordance with claim 6, wherein at least one slot-shaped recess is inserted in at least one of the two shells.

8. A chucking device for a drill tool comprising a two-part adapter sleeve disposed about a longitudinal axis with shells that can be pivoted in relation to each other around a shared pivoting axis that runs crosswise to the longitudinal axis of the sleeve and that are configured to receive and close around a portion of a drill with one drill tip at each end when pivoted about the pivoting axis.

9. The chucking device in accordance with claim 8, wherein the two shells are connected with each other by an elastic connection in the area of the shared pivoting axis.

10. The chucking device in accordance with claim 8, wherein the two shells can be opened at one end of the sleeve, about a V-shaped portion, around the shared pivoting axis.

* * * * *